June 2, 1970 H. B. JOYAUX 3,516,061

ELECTRICAL SIGNALING APPARATUS

Filed Dec. 4, 1967 3 Sheets-Sheet 1

INVENTOR
HENRI B. JOYAUX
BY
Kolisch + Hartwell
ATTORNEYS

June 2, 1970 H. B. JOYAUX 3,516,061

ELECTRICAL SIGNALING APPARATUS

Filed Dec. 4, 1967 3 Sheets-Sheet 2

INVENTOR
HENRI B. JOYAUX
BY Kolisch & Hartwell
ATTORNEYS

ELECTRICAL SIGNALING APPARATUS

Filed Dec. 4, 1967 3 Sheets-Sheet 3

INVENTOR
HENRI B. JOYAUX
BY
Kolisch & Hartwell
ATTORNEYS 3,516,061
ELECTRICAL SIGNALING APPARATUS Henri B. Joyaux, Beaverton, Oreg., assignor to Ford Industries, Inc., Portland, Oreg., a corporation of Washington Filed Dec. 4, 1967, Ser. No. 687,719
Int. Cl. H04q 9/14; G08b 26/00
U.S. Cl. 340—150 9 Claims

ABSTRACT OF THE DISCLOSURE

An electrical signaling system including plural communication devices arranged in pairs of corresponding groups with each device in a group associated with a device in the corresponding group, and a common transmission conductor for carrying information between associated devices. Included also is a pulse source producing successive trains of pulses, and a scanner for each group interconnected with the source and with the scanners for the groups. During each train of pulses the pairs of scanners for pairs of corresponding groups operate in succession, with each such pair of scanners, when actuated, connecting successive pairs of associated devices in the groups for communication, on a mutually exclusive basis, via the conductor.

This invention relates to an electrical signaling system including plural communication devices arranged in spaced pairs of corresponding groups, with each device in a group associated with a device in the corresponding group. More particularly, it relates to novel signaling apparatus in such a system for repeatedly connecting pairs of associated devices in the various groups successively, and on a mutually exclusive basis, for communication through a common transmission medium. For purposes of illustration, a preferred embodiment of the invention is described herein as an interior signaling system for aircraft of the commercial type.

In a signaling system of the type mentioned, where plural pairs of communication devices periodically share the use of a common transmission medium, obviously it is important that the various associated devices be connected to the medium at regular intervals, and in a coordinated and synchronized fashion. This is necessary if each device is to communicate properly with its associated device. However, it is also important that such performance be obtained with relatively simple circuitry, with as few conductors (or radio frequency channels) as possible employed to interconnect the devices in the spaced groups.

Simplicity is desirable for a number of reasons. Ordinarily it enhances reliability, which is an important consideration in a signaling system, and usually it reduces costs and minimizes maintenance problems. Further, such simplicity, through a reduction in the number of parts used, can result in a relatively low-weight, low-volume system, which is particularly important in equipment, such as an aircraft, where weight and space are critical factors.

Thus, a general object of the present invention is to provide, in a signaling system of the type outlined, novel signaling apparatus for interconnecting the various associated devices in the system for communication over a common transmission medium which takes the above-mentioned considerations into account in a practical and satisfactory manner.

More particularly, an object of the invention is to provide in such apparatus, novel scanning means which produces successive connections between different pairs of associated devices in the groups in a closely synchronized and coordinated manner, yet which employs relative simple circuitry, with few conductors (or radio channels) required for interconnecting the various groups of devices.

An important feature of the invention is that the scanning means is distributed throughout the system, with a separate scanning means provided for each group of devices. Each scanning means for a group includes a pulse-operated selecting means which functions, with each successive pulse received thereby, to connect the devices in the group successively for communication via the common transmission medium. Operating pulses are supplied by a common pulse conductor (or channel) operatively connected to each selecting means.

Cooperating with the various selecting means, and forming another important feature of the invention, is novel gating circuitry which functions to control the supply of pulses to the selecting means, whereby pulses are furnished recurrently, and on a mutually exclusive basis, to the pairs of selecting means in successive pairs of corresponding groups of devices. The gating circuitry thus permits the various selecting means to share the common pulse conductor (or channel), with each selecting means receiving pulses therefrom at the appropriate moments and for the proper time intervals.

With the scanning means distributed, a substantial reduction results in the number of conductors (or channels) required for interconnecting the common transmission medium and the various groups of devices. As an illustration, if conductors are employed, and the scanning means are formed in a centralized rather than a distributed manner, and placed at one location, a separate conductor is required for each communication device extending from the scanning apparatus to the device. Where the devices are relatively widely spaced apart, obviously this would require the use of a considerable amount of conductive material, typically copper wire which is heavy and bulky. In addition, the use of such a large number of conductors extending over relatively long distances would significantly increase the chances for malfunctioning in the system. With the proposed construction, however, the need for such extensive conductors, and the attendant problems, are eliminated.

Yet another object of the invention is to provide apparatus of the type so far described which performs satisfactorily regardless of whether each group of devices includes transmitting devices entirely, receiving devices entirely, or a combination of transmitting and receiving devices.

These and other objects and advantages attained by the invention will become more fully apparent as the description which follows is read in conjunction with the accompanying drawings, wherein.

Figure 1:
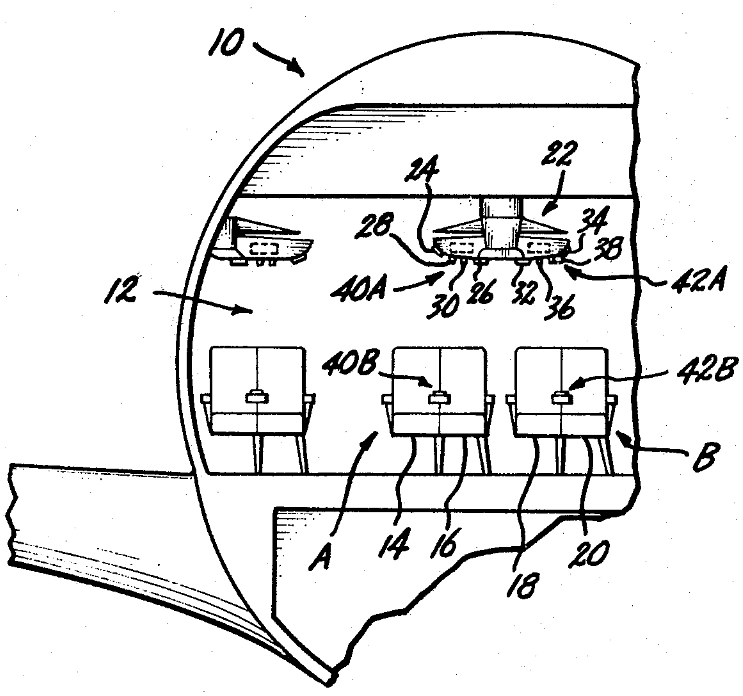
FIG. 1 is a simplified, fragmentary, cross-sectional view illustrating an aircraft employing a signaling system constructed according to the invention.

Turning now to the drawings, and referring first to FIG. 1, indicated generally at 10 is a commercial-type aircraft having a passenger compartment 12. Mounted on the floor of the compartment, and disposed in rows, such as rows A and B, extending along the length of the compartment are passenger seats, such as seats 14, 16 in row A and seats 18, 20 in row B. Suitably mounted in elongated overhead consoles, such as console 22, which extend along and over the various rows of seats, are relay-operated reading lamps and air valves which may be operated to direct light and air, respectively, toward each seat in the rows. Thus, in block form at 24, 26 and 28, 30 are lamps and air valves, respectively, and their associated operating relays for seats 14, 16. Similarly, in block form at 32, 34 and 36, 38 are lamps and valves, respectively, and their associated operating relays for seats 18, 20. There may, of course, be other passenger conveniences at each seat, such as attendant signaling buttons, sound control, etc.

Figure 2:
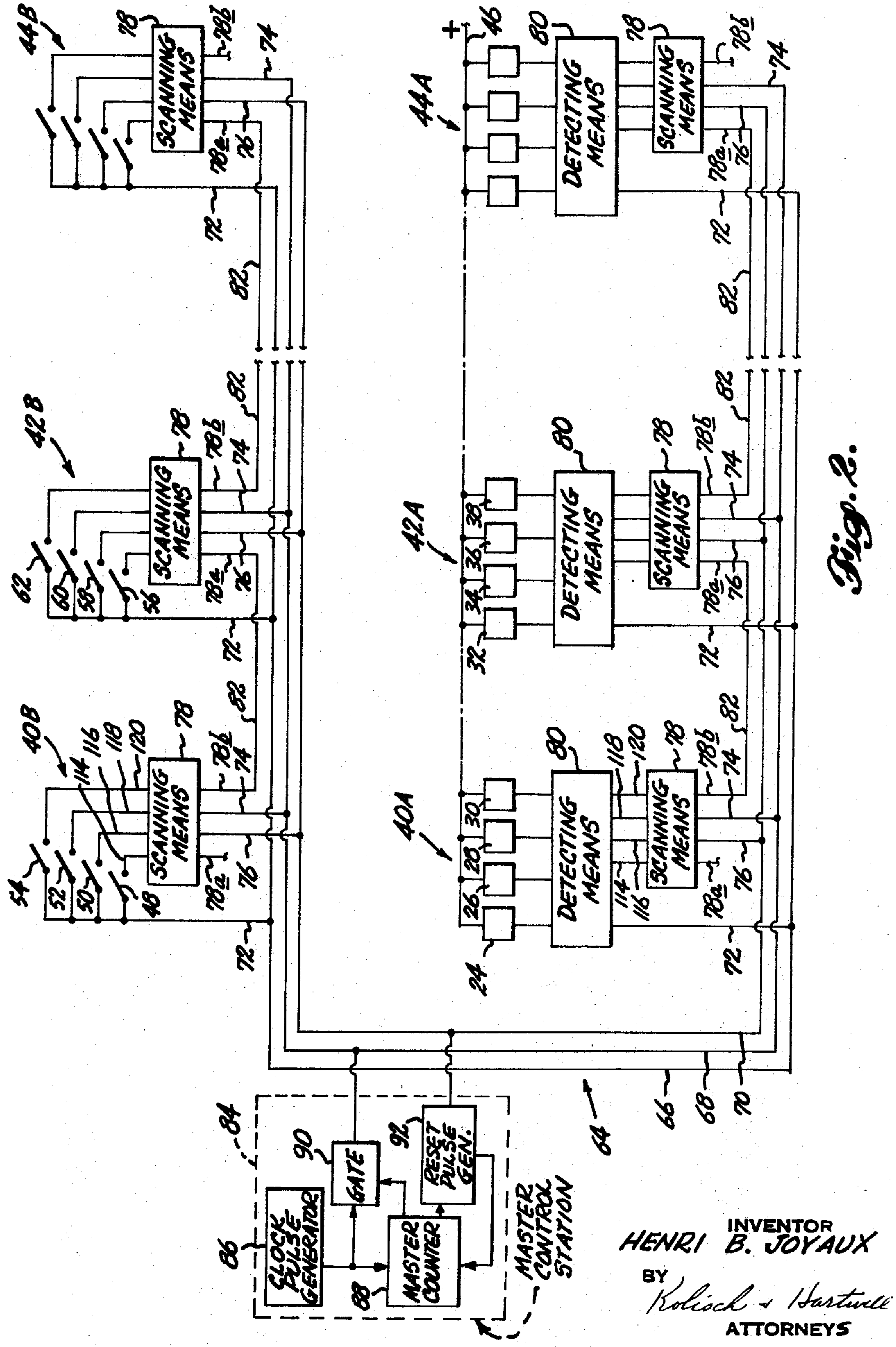
FIG. 2 is a schematic diagram, partly in block form, further illustrating the signaling system employed in the aircraft of FIG. 1.

Considering FIGS. 1 and 2 together, the lamps and air valves for each pair of side-by-side seats in a row constitute a group of communication devices, or receivers. Thus, lamps 24, 26 and air valves 28, 30 constitute a group 40A, and lamps 32, 34 and air valves 36, 38 constitute a group 42A. Another group of lamps and air valves for another pair of seats in compartment 12 is shown at 44A. The coils in the relays (concealed) for the lamps and valves in each group have one set of sides connected to a suitable positive voltage line 46 which may be connected to one of the DC power sources usually provided in an aircraft. In order to simplify the drawings, line 46 is the only power line which is illustrated, although it should be understood that suitable conductors are provided for supplying power to the various components in the system.

The lamps and air valves in each group are operated independently, as will be more fully explained, upon closure of switches provided adjacent the pair of seats directly beneath the respective lamps and valves. Thus, lamps 24, 26 and valves 28, 30 are operated by switches 48, 50 and 52, 54, respectively (shown individually in FIG. 2), provided adjacent seats 14, 16. These switches constitute a group 40B of communication devices, or transmitters, corresponding to group 40A. Similarly, switches 56, 58 and 60, 62 are associated with lamps 32, 34 and valves 36, 38, respectively, and constitute a group 42B corresponding to group 42A. Another group of switches is indicated generally at 44B for operating the lamps and valves in previously-mentioned group 44A.

Referring now particularly to FIG. 2, interconnecting the various groups of lamps and valves and switches is an elongated cable 64 which may be mounted on the aircraft in any suitable manner. The cable includes a signal conductor, or common transmission medium, 66, a common clock pulse conductor 68, and a common reset pulse conductor 70. Conductors 66, 68, 70 are operatively connected to each group of switches through jumper conductors 72, 74, 76, respectively, and through a scanning means 78 indicated in block form and constructed according to the invention. Conductors 66, 68, 70 are also operatively connected to each group of lamps and air valves through a similar set of jumper conductors (which are given the same reference numbers herein as the other sets of jumper conductors just mentioned), through a scanning means which is substantially the same in construction as the scanning means employed for each group of switches, and through a detecting means 80 constructed according to the invention. Because of their respective similarities, the various scanning and detecting means are designated by similar respective reference numerals.

Each scanning means includes what is referred to herein as a transfer-in terminal **78*a* and a transfer-out terminal 78*b*, the purposes of which will be more fully discussed later. Referring still to FIG. 2, the scanning means for groups 40A, 40B, which may be thought of as the first pair of corresponding groups along the cable, have their terminals 78*a* left externally unconnected to anything. Terminals 78*b*, however, are connected through transfer conductors 82 to terminals 78*a* in the scanning means for the next successive pair of corresponding groups, 42A, 42B. In a like manner, the transfer-in and transfer-out terminals in all scanning means for successive pairs of corresponding groups along cable 64 are interconnected through similar transfer conductors. However, the transfer-out terminals in the scanning means for groups 44A, 44B**, the last pair of corresponding groups along the cable, are left externally unconnected to anything.

Further describing what is illustrated in FIG. 2, indicated generally at 84 is a master control station which functions to supply clock pulses and reset pulses to conductors 68, 70, respectively, in cable 64. More particularly, station 84 includes a clock pulse generator 86 having its output connected to the input of a master binary counter 88, and to the input of a gate 90, which, together with generator 86, constitutes a clock pulse source herein. One output of the counter is also connected to gate 90, and the output of the gate is connected to clock pulse conductor 68. Another output of counter 88 is connected to a reset pulse generator, or source, 92 which has its output connected to reset pulse conductor 70.

The various components making up control station 84 are shown herein only in block form since they may readily be constructed in any one of a number of ways known to those skilled in the art. Preferably, however, such components take the form of integrated circuit devices (which are commercially available) that are light in weight and require little space.

Briefly describing the operation of the control station, with the master counter in a zero-count state, generator 92 is turned off, and gate 90 is open. Clock pulses produced by the generator 86 are fed through the gate to conductor 68, and counted by the counter. In the embodiment illustrated, this situation remains until the ninetieth (90th) consecutive pulse has been supplied to conductor 68 and counted in the counter. Upon conclusion of the ninetieth pulse, gate 90 is closed for a short interval of time, and simultaneously, generator 92 is operated to produce a reset pulse which it supplies to conductor 70. The reset pulse produced herein is approximately twice as long as a clock pulse. At the end of a single reset pulse, generator 92 is again turned off, counter 88 is reset to a zero-count state and gate 90 is opened again to admit clock pulses to conductor 68. Such operation continues repeatedly, with successive trains of clock pulses supplied to conductor 68, and such trains interrupted momentarily with a reset pulse supplied to conductor 70.

While the organization shown produces trains of ninety clock pulses, in order to provide the present system with a sufficient number of pulses, it may readily be constructed to produce trains with different number of pulses. A typical pulse rate for clock pulses might be between 800 and 1,000 pulses per second.

The various components in control station 84, as well as those (still to be described) in the scanning and detecting means, operate in response to a pair of voltage levels. More specifically, one of these levels corresponds to a certain positive voltage (typically five volts), which will be referred to hereinafter as a binary "1" voltage state, or simply a "1" state. The other level corresponds to a substantially lower, nearly ground-level, voltage, which will be called hereinafter a binary "0" voltage state, or simply a "0" state. A terminal or conductor having one of these voltage levels on it will be referred to as being in, or having on it, either a "1" or a "0" state.

Signal conductor 66, because of its connection through jumpers 72 with components in the various detecting means, normally is in a "1" state. Conductors 68, 70 are each normally in a "0" state. Each clock pulse supplied to conductor 68 places the conductor in the "1" state, with the conductor returning to the "0" state after the pulse. Each reset pulse supplied to conductor 70 produces a similar change in the voltage level thereon.

Figure 3:
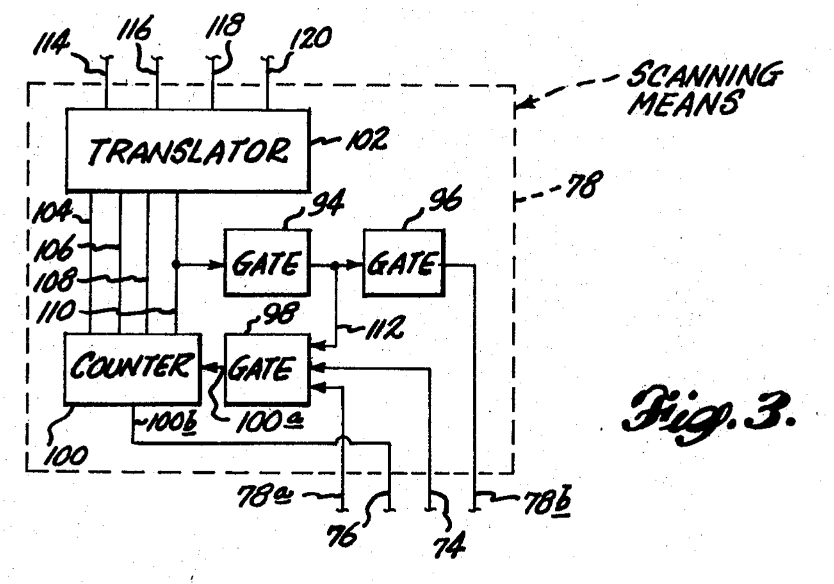
FIG. 3 is a schematic diagram illustrating a scanning means employed in the signaling system of FIG. 2.

Describing now the construction and operation of a scanning means, and referring to FIG. 3, the scanning means includes a plurality of electronic gates 94, 96, 98, an electronic binary counter 100, and what is called a binary-coded-decimal to decimal electronic converter, or translator, 102 connected to the counter through conductors 104, 106, 108, 110. The gates, counter and translator are each conventional in internal design, and preferably are formed from integrated circuit devices.

Gates 94, 96 constitute a gating circuit in the scanning means. Gate 94 has its input (which forms an input terminal for the gating circuit) connected to conductor 110, and has its output connected to the input of gate 96 and through a conductor 112 to one of the inputs of gate 98. Conductor 112 constitutes one of the output terminals of the gating circuit. The output of gate 96, forming another output terminal of the gating circuit, is connected to previously-mentioned transfer-out terminal **78*b*** in the scanning means.

Gates 94, 96 function as signal inverters. More particularly, and considering each gate, with the input of the gate in a "1" state, the output terminal of the gate is in a "0" state, and vice versa. Thus, with a "0" state existing at the input of gate 94, a "1" state exists at the input of gate 96 and on conductor 112, and a "0" state exists on terminal **78*b*. When the input of gate 94 switches to a "1" state, the situation at the output terminals of the gating circuit reverses, with conductor 112 switching to a "0" state, and terminal 78*b*** switching to a "1" state. Such voltage conditions at the two output terminals of the gating circuit are referred to herein as control signals.

The gating circuit just described, together with the gating circuits provided in the other scanning means, together comprise gating control means in the system.

Gate, or gating means, 98 has another input terminal connected to previously-mentioned jumper conductor 74, which, it will be recalled, is connected to the clock pulse conductor in cable 64. Yet another input terminal of gate 98 is connected to transfer-in terminal **78*a*. The output of gate 98 is connected to the counting input 100*a* of counter 100. Gate 98** functions as what is known as a 3-input NAND gate. More particularly, so long as as less than all of the three inputs are in "1" states, the output of the gate is also in a "1" state. However, upon all of the inputs simultaneously being in "1" states, the gate's output is then in a "0" state. A "1" state on an input may result either from the application thereto of the positive voltage mentioned earlier, or from leaving the input in a floating state where it is externally unconnected to anything.

Thus, it will be apparent that with "1" states existing on conductor 112 and on terminal **78*a*, clock pulses on conductor 68, which cause the voltage level on conductor 74 to alternate between a "0" and "1" state, are admitted through the gate to input 100*a* in the counter. With the gate admitting pulses, it may be thought of as being in an open state. However, if either conductor 112 or terminal 78*a***, or both, are in a "0" state, then clock pulses are blocked by the gate and not admitted to the counter. When blocking the clock pulses, the gate may be thought of as being in a closed state.

Counter 100 and translator 102 together comprise a selecting means herein. Successive pulses admitted through gate 98 to the counting input of the counter (which input also constitutes an input terminal for the selecting means), are counted in the counter. For each successive pulse counted, the counter produces a related set of voltage states, of the type so far discussed, on conductors 104, 106, 108, 110 which constitute output terminals for the counter. In addition to counting input **100*a*, the counter includes a reset terminal 100*b*. Upon the application of a reset pulse to this terminal, and regardless of what count then exists in the counter, the latter is switched to a zero-count state. Translator 102 responds to the voltage conditions on these conductors to furnish output signals, or voltage levels, to conductors 114, 116, 118, 120** which constitute a set of output terminals for the selecting means.

More specifically, the following table illustrates what voltage states exist on conductors 104, 106, 108, 110, 114, 116, 118, 120 for different counts stored in the counter:

TABLE 1

| Count | Voltage states on different conductors | | | | | | | |
|---|---|---|---|---|---|---|---|---|
| | 104 | 106 | 108 | 110 | 114 | 116 | 118 | 120 |
| 0 | 0. | 0 | 0 | 0 | 1 | 1 | 1 | 1 |
| 1 | 1 | 0 | 0 | 0 | 0 | 1 | 1 | 1 |
| 2 | 0 | 1 | 0 | 0 | 1 | 0 | 1 | 1 |
| 3 | 1 | 1 | 0 | 0 | 1 | 1 | 0 | 0 |
| 4 | 0 | 0 | 1 | 0 | 1 | 1 | 1 | 1 |
| 5 | 1 | 0 | 1 | 0 | 1 | 1 | 1 | 1 |
| 6 | 0 | 1 | 1 | 0 | 1 | 1 | 1 | 1 |
| 7 | 1 | 1 | 1 | 0 | 1 | 1 | 1 | 1 |
| 8 | 0 | 0 | 0 | 1 | 1 | 1 | 1 | 1 |

For reasons which will become apparent, the above table shows only the conditions existing up to the eighth count registered by the counter. It will be noted that translator 102 performs in such a manner, that for all conditions shown, conductors 114, 116, 118, 120 are in "1" states, except during the first, second, third and fourth counts when such respective conductors are switched selectively to a "0" state.

Explaining the operation of the scanning means as a whole, with the counter initially in a zero-count state, the input of gate 94 is in a "0" state and the output of the gate is in a "1" state. Thus, conductor 112, and the input of gate 98 connected thereto, are also in "1" states. In addition, the output of gate 96, and terminal **78*b*, are in "0" states. Upon the application of a binary "1" voltage state to terminal 78*a*, and with clock pulses available on conductor 74, such pulses are admitted through gate 98 to counter 100**.

The first four pulses received result in conductors 114, 116, 118, 120 switching momentarily and successively to "0" states as shown in Table 1. The fifth, sixth and seventh pulses received are counted by the counter, but result in no further change in the voltage conditions on conductors 114, 116, 118, 120. Upon the eighth pulse being received, conductor 110 is switched to a "1" state. This "1" state voltage condition on conductor 110 constitutes a gating trigger signal applied to the input of gate 94. Conductor 112 then switches to a "0" state, and terminal **78*b* switches to a "1" state. And with this change of the voltage condition on conductor 112, gate 98 is placed in its closed state with pulses on conductor 74** then blocked from the counter.

Nothing further takes place in the scanning means until the application of a reset pulse to terminal **100*a* in the counter. When this occurs, the counter is returned to a zero-count state, and is again in a condition to begin counting another set of eight pulses, upon the proper voltage conditions again existing at the inputs to gate 98**.

Figure 4:
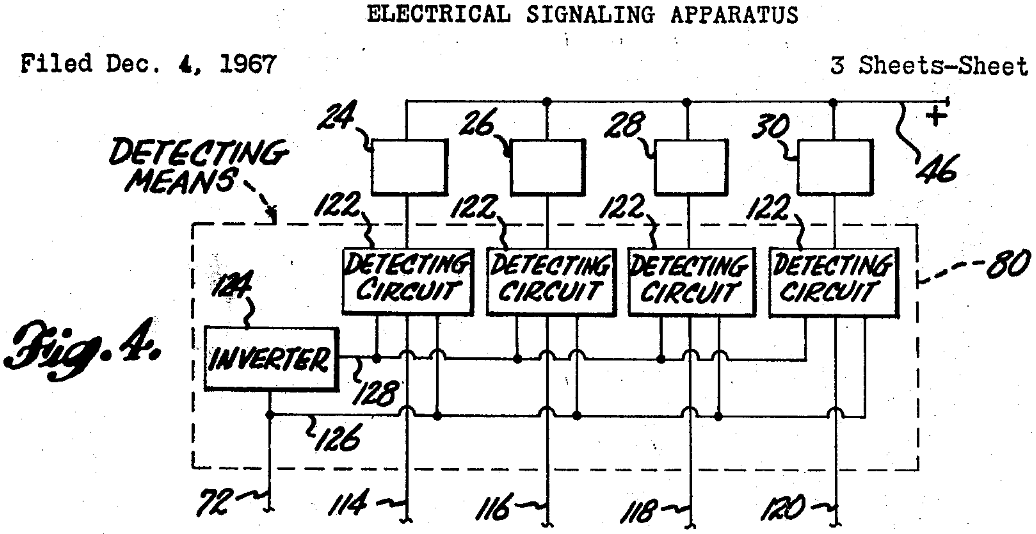
FIG. 4 is a schematic diagram showing a detecting means also employed in the system of FIG. 2.

Turning now to FIG. 4, the detecting means 80 provided for each group of lamps and air valves includes a plurality of detecting circuits 122, with one detecting circuit provided for each lamp and valve. The detecting means also includes a signal inverter 124 which is connected to the common signal conductor in cable 64 through previously mentioned jumper conductor 72. Inverter 124 is preferably an integrated circuit device and performs in much the same manner as gates 94, 96.

Each detecting circuit includes three input terminals, with one connected directly to conductor 72 through a conductor 126, another connected directly to the output of inverter 124 through a conductor 128, and the third connected to one of the output terminals coming from the translator in a scanning means. The detecting circuits shown, which are for devices 24, 26, 28, 30, have input terminals connected to conductors 114, 116, 118, 120, respectively.

Figure 5:
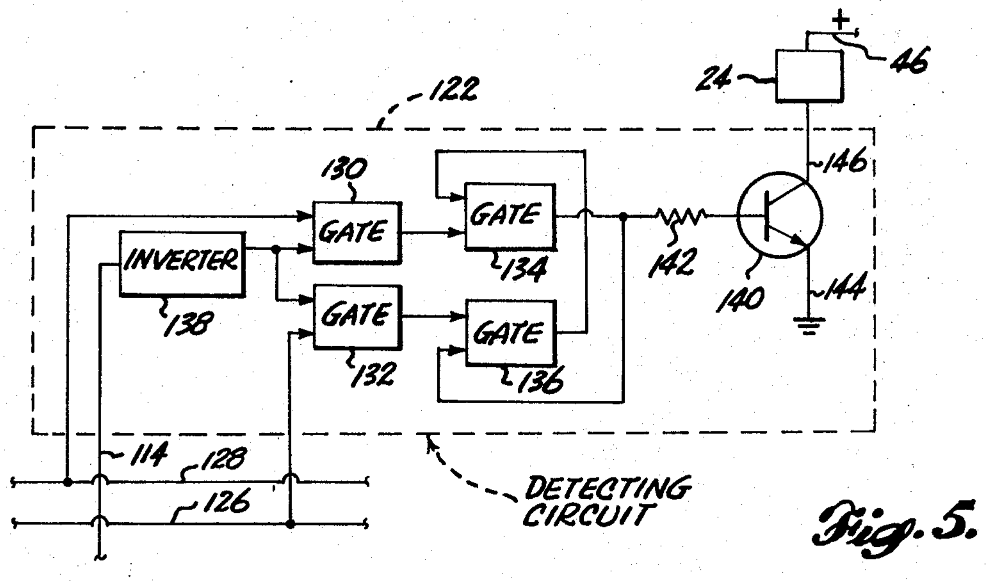
FIG. 5 is a schematic diagram illustrating a detecting circuit forming part of the detecting means of FIG. 4.

The various detecting circuits are substantially the same in construction, and considering the detecting circuit for lamp 24, this is illustrated in FIG. 5. The circuit includes a plurality of what are known as dual-input NAND gates 130, 132, 134, 136, a signal inverter 138, and an output transistor 140. The inverter and gates are conventional in internal design, and preferably take the form of integrated circuit devices. Inverter 138 has its input connected directly to conductor 114, and its output connected to an input of gate 130, and to an input of gate 132. The other input of gate 130 is connected to conductor 128, and the other input of gate 132 is connected to conductor 126. Gates 130, 132 have their outputs connected to one set of inputs of gates 134, 136, respectively. The output of gate 134 is connected to the other input of gate 136, and the output of gate 136 is connected to the other input of gate 134.

Gates 130, 132, 134, 136 operate in somewhat the same manner as previously-described gate 98, except that they have two, instead of three, inputs. Thus, and considering each gate, in order for a "0" state to exist on the output of the gate, both inputs thereto must be in a "1" state. If either or both of the inputs is in a "0" state, the output of the gate is in a "1" state.

Further describing the detecting circuit, the output of gate 134 additionally is connected through a resistor 142 to the base of transistor 140. The transistor's emitter is connected to ground at 144. The collector of the transistor is connected to the relay coil for lamp 24 on the opposite side of the coil from that connected to conductor 146.

Explaining now how each detecting circuit, such as the one shown in FIG. 5, operates in the detecting means, it will be evident that signals existing on the common signal conductor, and hence on jumper conductor 72, are fed directly to conductor 126, and are fed in inverted form to conductor 128. Thus, when a "1" state exists on the signal conductor, it also exists on conductor 126, and a "0" state then exists on conductor 128. When the voltage level on the signal conductor switches to a "0" state, this is applied to conductor 126, and conductor 128 then has a "1" state on it.

Assuming that a "1" state exists on conductor 114 (this being the usual voltage state existing on the conductor), the output of inverter 138, which is applied to an input in each of gates 130, 132 is in a "0" state. With this the case, regardless of the voltage conditions existing on conductors 126, 128, the outputs of gates 130, 132 are in "1" states. Normally, transistor 140 is in a nonconductive state, and this means that the output of gate 134 is normally in a "0" state. With the output of gate 134 connected to an input of gate 136, and with a "0" state existing on this output, gate 136 is normally held in a condition with a "1" state on its output. This in turn is applied to the other input of gate 134, and serves to hold gate 134 in a condition with its output in a "0" state.

As will be more fully explained, each time that a signal pulse is applied to the common signal conductor, the voltage level on this conductor, and hence on conductor 126, switches to a "0" state. Thus, the voltage on conductor 128 switches to a "1" state. Under such circumstances, should conductor 114 simultaneously be switched to a "0" state, a "1" state then exists on each of the inputs to gate 130, and the gate is operated to place its output in a "0" state. When this occurs, gate 134 operates to place its output in a "1" state, with gate 136 then operating to place its output in a "0" state. Gates 134, 136 then lock one another in the new conditions to which they have been switched.

With the output of gate 134 in the "1" state, a positive voltage is applied to the base of transistor 140, the transistor conducts, and the lamp 24 becomes energized.

This situation remains until such time as conductor 114 is switched to a "0" state with the common signal conductor simultaneously having a "1" state on it. When this occurs, a "1" state exists on each of the inputs for gate 132, whereupon the output of this gate switches to a "0" state. This results in gates 134, 136 returning to their first-mentioned conditions, with the output of gate 134 in a "0" state, and that of gate 136 in a "1" state. Transistor 140 then stops conducting, and lamp 24 is turned off.

Thus, and summarizing the operation of the detecting circuit, with lamp 24 off, upon the occurrence simultaneously of a "0" state on conductor 114 and also on the common signal conductor, transistor 140 is placed in a conducting state and the lamp is turned on. With the lamp on, upon the occurrence simultaneously of a "0" state on conductor 114, and a "1" state on the common signal conductor, the lamp is turned off.

A similar operation takes place in the other detecting circuits provided for the various other lamps and valves.

Explaining now how the signaling system so far described operates, let us assume that initially no lamps or air valves are energized. Prior to the initiation of a train of clock pulses, the counters provided in the various scanning means are all in their zero-count states. Thus, output terminals 114, 116, 118, 120 connected to the translator in each scanning means all are in "1" states, and all transfer-out terminals 78*b* are in "0" states. Because the transfer-in terminals of the scanning means for groups 40A, 40B are unconnected to anything external to the scanning means, gates 98 in the scanning means are in their open states, and thus in conditions for admitting clock pulses to the counters associated with them. However, because every other scanning means in the system has its transfer-in terminal connected through a conductor 82 to the transfer-out terminal of another scanning means, and because every transfer-out terminal initially has a "0" state on it, gates 98 in these other scanning means are initially in their closed states. Thus, initially, pulses on clock pulse conductor 68 can be admitted only to the counters in the scanning means for groups 40A, 40B.

Upon the first clock pulse in a train being applied to the clock pulse conductor, and considering what occurs in group 40B, conductor 114 is momentarily switched to a "0" state. If switch 48 (FIG. 2), which is connected to conductor 114, is closed at this moment, then the common signal conductor is also momentarily switched to a "0" state. If the switch is open, the signal conductor remains in a "1" state.

Considering what takes place in group 40A upon the occurrence of the first pulse, conductor 114 for this group is also momentarily switched to a "0" state, and this voltage level is fed to the detecting circuit associated with lamp 24. If switch 48 is closed, then simultaneously the "0" state voltage resulting on the common signal conductor is fed through conductor 72 also to the detecting circuit associated with lamp 24. And, it will be recalled that under such circumstances lamp 24 turns on. Further, with turning on of the lamp, gates 134, 136 in the detecting circuit for the lamp lock one another into conditions maintaining the lamp in an energized condition.

Upon the next clock pulse being transmitted to the clock pulse conductor, conductors 116 in groups 40A, 40B are switched to "0" states, and if switch 50 is closed, lamp 26 turns on. In a similar manner, the third and fourth clock pulses in a train permit switches 52, 54 to cause valves 28, 30, respectively, to be energized. The fifth, sixth and seventh pulses are not employed in the system shown herein.

Upon the occurrence of the eighth clock pulse, gates 98 in the scanning means for groups 40A, 40B are switched to their closed states, due to a "0" state voltage then appearing on conductors 112, whereupon no further pulses in the train are admitted through the gates. Simultaneously, the transfer-out terminals in these scanning means are switched to "1" states. When this occurs, gates 98 in the scanning means for groups 42A, 42B are switched to their open states, and clock pulses are then admitted through such gates. In the same fashion as that just described for groups 40A, 40B, the first four pulses received and counted in the counters for groups 42A, 42B permit switches 56, 58, 60, 62 to energize lamps 32, 34 and valves 36, 38.

Thus, as a train of pulses continues, associated lamps, valves and switches in successive corresponding pairs of group are permitted to communicate with one another. At any particular moment, however, pulses are admitted to the counters in only one pair of corresponding groups. After the ninetieth pulse in a train, which will occur after all counters in all scanning means have received eight pulses, the supply of clock pulses to conductor 68 is interrupted, and a reset pulse is transmitted to conductor 70. This reset pulse is simultaneously applied to the reset terminals in all counters in the various scanning means, and such counters are then reset to zero-count states. The next train of pulses then begins.

So long as a switch, for example switch 48, remains closed, the device (lamp 24) associated with it remains energized. When the switch is subsequently opened, and upon the next first pulse in a train being transmitted causing conductors 114 for groups 40A, 40B to be switched to "0" states, proper voltage conditions exist in the detecting circuit for lamp 24 to turn the lamp off. The same is true for the other switches and their associated lamps and valves.

Thus, it is possible for a large number of associated communication devices in plural groups to be connected for communication with one another with a minimal number of conductors required to extend between the devices. An important factor in eliminating the number of conductors needed is that the system operates on a time-sharing basis. Thus, a common signal conductor can be used, with different pairs of associated devices allotted different time slots during each pulse train when they can communicate via the conductor. And, with the scanning means (the counters and translators in the selecting means) distributed throughout the system, the earlier-mentioned problems encountered with a centralized selecting means are avoided. Accordingly, a cable extending between groups of devices need only carry common signal, clock pulse and reset conductors, and appropriate transfer conductors as shown.

The novel gating means and gating control means cooperate in the distributed scanning means, and produce a coordinated, sequential supply of pulses, at the appropriate times, to the respective selecting means for the various groups.

The system shown is quite versatile. It will be noted, for example, that the various scanning means for the different groups are constructed in the same manner. Thus, ready interchangeability is possible. The counter and translator in a scanning means may easily be constructed to accommodate a lesser or greater number of devices than the number described herein. In addition, a given scanning means need not be employed exclusively with transmitting devices alone, or receiving devices alone, but can easily be used with various combinations of such devices.

Further, and through proper allotment of the various time slots available during each pulse tran, transmitting and receiving devices of various forms may be used, including momentary-type transmitting switches, and modulated-signal type transmitters and receivers. Also, radio frequency channels may be used instead of conductors.

The master control station may, of course, be constructed to provide clock pulse trains having more or less than the number of pulses described herein, and having different pulse frequencies.

A system according to the invention offers a number of advantages. To begin with it can accommodate many communication devices, such as the numerous lamps, air valves, and switches provided for passengers' comfort. The system requires only a relatively low-weight, low-volume cable for interconnecting such devices. It may be easily incorporated in the frame of an aircraft without requiring too much space or adding too much weight and is relatively trouble free. Further, the feature of interchangeability noted earlier, makes the system particularly suited for use in aircraft which are frequently converted back and forth for use at one time as a freight carrier and at another time as a passenger carrier.

Futher considering the versatility of the system, because the scanning means for each group includes a counter that recycles, it is a relatively simple matter to provide means at a central location for turning on all receiving devices of a given type (for example all lights). In the embodiment illustrated, the first two pulses in each successive set of eight pulses in a train provide time slots for turning on the various lamps in the groups. Through the use of a counter (which may be the master counter), an appropriate translator, and a switch for connecting the output of the translator to the signal conductor, it is possible to apply a "0" state voltage to the signal conductor during such time slots. Preferably, the switch employed would connect the translator output to the portion of the signal conductor extending to groups 40A, 42A, etc., while breaking the connection between this portion of the signal conductor, and the portion thereof extending to groups 40B, 42B, etc.

With such a modification, all lamps (or other devices) could be turned on and off from a central station for testing or other purposes.

While a preferred embodiment of the invention has been described herein, and certain modifications mentioned, it is appreciated that other variations and modifications are possible without departing from the spirit of the invention. Accordingly, it is desired to cover all such variations and modifications that become apparent to those skilled in the art, and which come within the scope of the appended claims.

It is claimed and desired to secure by Letters Patent:

1. For use in an electrical signaling system including plural communication devices arranged in pairs of corresponding groups, with each device in a group adapted to cooperate with a different device in the corresponding group, and a common transmission medium for transmitting information between such cooperating devices, a clock pulse source producing successive trains of clock pulses, and scanning means actuated by such pulses for repeatedly connecting different pairs of cooperating devices successively for communication via said medium, said scanning means in operative condition comprising pulse-operated electronic selecting means for each group operatively connected to the devices in the group, including an input terminal for receiving clock pulses, and operable, in response to successive clock pulses received at said input terminal, selectively and successively to connect the devices in the group for communication through the medium, with the pair of selecting means for each pair of corresponding groups sequentially, and substantially simultaneously, producing such successive connections for pairs of cooperating devices in the groups, electronic gating means for each group operatively interposed between the group's selecting means and said source for controlling the supply of clock pulses to the input terminal in the selecting means, said gating means having a closed state in which it blocks the supply of pulses to the input terminal, and an open state in which it admits pulses to the terminal, and gating control means interconnecting the selecting and gating means for the various groups, responsive to the operations of the various selecting means during each train of pulses produced by the source to place the pair of gating means for each pair of corresponding groups successively in their open states, with the other gating means then held in their closed states.

2. The organization of claim 1, wherein, for each pair of groups where, during each train of clock pulses, the devices in one of the groups are connected for communication via said medium immediately prior to those of the other group, said gating control means comprises a gating circuit having an input terminal connected to the selecting means for the one group and an output terminal connected to the gating means for the other group, said gating circuit being operable, in response to the selecting means for said one group receiving a certain number of pulses which exceeds the number of devices in the one group, to produce at its output terminal a control signal placing the gating means for said other group in its said open state.

3. The organization of claim 2, wherein said gating circuit further includes another output terminal connected to the gating means for the one group, with said gating circuit, on producing a control signal at its first-mentioned output terminal, simultaneously producing another control signal at its other output terminal placing the gating means for the one group in its said closed state.

4. The organization of claim 3, wherein the selecting means for each group includes a set of output terminals with each terminal operatively connected to a device in the group, an electronic counter connected to the selecting means' input terminal responsive to pulses admitted to said input terminal to produce a count of such pulses, and a translator interconnecting said counter and said output terminals responsive to different counts of pulses as determined by said counter to supply an output signal selectively and exclusively to different ones of said output terminals.

5. The organization of claim 4, wherein the counter in each selecting means includes a pulse-responsive reset terminal through which a pulse may be supplied to reset the counter to a zero-count state, and which further includes a reset pulse source operatively connected to said clock pulse source and to the reset terminal in each counter, operable, upon the conclusion of each train of pulses produced by said clock pulse source, to produce a reset pulse with such furnished simultaneously to all of said reset terminals.

6. The organization of claim 4, wherein, considering each selecting means and the gating circuit which is connected to it, the counter in the selecting means has an output terminal which furnishes a gating trigger signal on the counter receiving and counting said certain number of pulses, and the input terminal of the gating circuit is operatively connected to said counter's output terminal to receive such a trigger signal.

7. The organization of claim 6, wherein said common transmission medium comprises a conductor, in each pair of corresponding groups each pair of cooperating communication devices includes a transmitter in one of the groups interconnecting said conductor and one of the output terminals of the selecting means for said one group, with the transmitter being actuatable to close a circuit between said one terminal and said conductor for the supply of signals from the former to the latter, and a receiver in the corresponding group, and in said corresponding group there is detecting means including a detecting circuit operatively interconnecting said receiver, said conductor, and an output terminal in the selecting means for the group, said detecting circuit, on detecting the presence of signals simultaneously on said conductor and on said second-mentioned output terminal herein, producing a signal effecting a response in said receiver.

8. In an aircraft, an electrical signaling system comprising plural communication devices arranged in pairs of corresponding groups, with each device in a group adapted to cooperate with a different device in the corresponding group, a common transmission medium for transmitting information between cooperating devices comprising a signal conductor operatively interposed between said groups, a clock pulse source producing successive trains of clock pulses and a clock pulse conductor connected to said source, and scanning means actuated by such clock pulses for repeatedly connecting different pairs of cooperating devices successively for communication via said signal conductor, said scanning means in operative condition comprising pulse-operated electronic selecting means for each group operatively connected to the devices in the group, including an input terminal for receiving clock pulses, and operable, in response to successive clock pulses received at said input terminal, selectively and successively to connect the devices in the group for communication through said signal conductor, with the pair of selecting means for each pair of corresponding groups sequentially and substantially simultaneously producing such successive connections for pairs of cooperating devices in the groups, electronic gating means for each group operatively interconnecting the group's selecting means and said clock pulse conductor for controlling the supply of clock pulses to the input terminal in the selecting means, said gating means having a closed state in which it blocks the supply of pulses to the input terminal, and an open state in which it admits pulses to the terminal, and gating control means interconnecting the selecting and gating means for the various groups, responsive to the operations of the various selecting means during each train of pulses produced by the source to place the pair of gating means for each pair of corresponding groups successively in their open states, with the other gating means then held in their closed states.

9. The organization of claim 8, wherein the aircraft includes a passenger compartment having seats, and considering each pair of corresponding groups, one of the groups in the pair includes a signal transmitter mounted adjacent a seat in the compartment, and the other group includes a signal receiver associated with said transmitter and spaced from said seat.

References Cited

UNITED STATES PATENTS

| | | | |
|---|---|---|---|
| 3,392,378 | 7/1968 | Perry | 340—150 XR |
| 3,402,404 | 9/1968 | Burley et al. | 340—176 |

DONALD J. YUSKO, Primary Examiner

U.S. Cl. X.R.

340—413